United States Patent
Li et al.

(10) Patent No.: US 10,922,386 B1
(45) Date of Patent: Feb. 16, 2021

(54) SYSTEM AND METHODS FOR SECURITY INSPECTION AND PROTECTION OF SOFTWARE CONTAINERS AT RUNTIME

(71) Applicant: Trend Micro Incorporated, Tokyo (JP)

(72) Inventors: Ching-Yi Li, Taipei (TW); You-Hsin Yang, Taipei (TW); Nai-Yu Chuang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 423 days.

(21) Appl. No.: 15/871,475

(22) Filed: Jan. 15, 2018

(51) Int. Cl.
| | | |
|---|---|---|
| *G06F 9/54* | (2006.01) | |
| *G06F 21/12* | (2013.01) | |
| *G06F 21/53* | (2013.01) | |
| *G06F 21/56* | (2013.01) | |

(52) U.S. Cl.
CPC ............ *G06F 21/12* (2013.01); *G06F 9/54* (2013.01); *G06F 21/53* (2013.01); *G06F 21/56* (2013.01); *G06F 2221/033* (2013.01)

(58) Field of Classification Search
CPC combination set(s) only.
See application file for complete search history.

(56) References Cited

U.S. PATENT DOCUMENTS

| | | | |
|---|---|---|---|
| 7,734,951 B1 * | 6/2010 | Balasubramanian | ........................ G06F 11/1435 714/6.13 |
| 8,151,360 B1 * | 4/2012 | Kishore | .............. H04L 67/1097 726/28 |
| 10,025,924 B1 * | 7/2018 | Vagin | ...................... G06F 9/455 |
| 2004/0003071 A1 * | 1/2004 | Mathew | .................. G06F 21/62 709/223 |

(Continued)

OTHER PUBLICATIONS

Wikipedia—Indicator of compromise (IOC), Oct. 1, 2017, 1 page [retrieved on Nov. 27, 2017], retrieved from the Internet: https://en.wikipedia.org/wiki/Indicator_of_compromise.

(Continued)

*Primary Examiner* — Lynn D Feild
*Assistant Examiner* — Abdullah Almamun
(74) *Attorney, Agent, or Firm* — Okamoto & Benedicto LLP

(57) ABSTRACT

The present disclosure provides effective solutions to security inspection and monitoring of operations within security containers. The solutions overcome the challenges and difficulties caused by the isolation of the containers. One embodiment relates a computer-implemented method in which a security agent is migrated between one or more containers and the host machine by changing its namespace. Another embodiment relates to a computer-implemented method for user-mode object monitoring of one or more containers in which a security agent migrates serially to multiple containers while keeping user-mode object-monitoring handles for the containers. Thereafter, the security agent may migrate into the host machine and continue monitoring events within the containers using the user-mode object-monitoring handles. Another embodiment relates to a host machine which includes a master agent that communicates with multiple security agents holding user-mode object-monitoring handles for corresponding containers. Other embodiments and features are also disclosed.

21 Claims, 8 Drawing Sheets

(56) References Cited

U.S. PATENT DOCUMENTS

| | | | | |
|---|---|---|---|---|
| 2004/0260801 | A1* | 12/2004 | Li | H04L 51/12 |
| | | | | 709/223 |
| 2009/0287772 | A1* | 11/2009 | Stone | H04L 67/28 |
| | | | | 709/203 |
| 2016/0373327 | A1* | 12/2016 | Degioanni | G06F 21/552 |
| 2017/0098072 | A1* | 4/2017 | Stopel | G06F 21/554 |
| 2018/0246756 | A1* | 8/2018 | Abali | G06F 9/544 |
| 2018/0260574 | A1* | 9/2018 | Morello | G06F 9/44505 |
| 2019/0114161 | A1* | 4/2019 | Iyer | G06F 21/44 |
| 2019/0156023 | A1* | 5/2019 | Gerebe | G06F 21/54 |
| 2019/0213319 | A1* | 7/2019 | Gerebe | H04L 63/08 |
| 2020/0067802 | A1* | 2/2020 | Degioanni | G06F 11/301 |

OTHER PUBLICATIONS

Namespaces (7)—Linux manual page, 6 pages [retrieved on Nov. 27, 2017], retrieved from the internet: http://man7.org/linux/man-pages/man7/namespaces.7.html.

What is a Container | Docker—Package software into standardized units for development, shipment and deployment, 8 pages [retrieved on Nov. 27, 2017], retrieved from the Internet: https://www.docker.com/what-container.

\* cited by examiner

SYSTEM AND METHODS FOR SECURITY INSPECTION AND PROTECTION OF SOFTWARE CONTAINERS AT RUNTIME

BACKGROUND OF THE INVENTION

1. Field of the Invention

The present disclosure relates generally to computer security. More particularly, the present disclosure relates to computer security and protection for software containers.

2. Description of the Background Art

A software container or container image is a lightweight, standalone, executable package of a piece of software that includes everything needed to run it: code; runtime (i.e. executable code); and necessary system tools, system libraries, and settings. Multiple containers can run on the same machine, and share the operating system (OS) kernel with other containers, as isolated processes in user space.

The OS kernel uses a namespace mechanism to enforce the isolation. A namespace wraps a global system resource in an abstraction that makes it appear to the processes within the namespace that they have their own isolated instance of the global resource. Changes to the global resource are visible to other processes that are members of the namespace, but are invisible to other processes. Besides the namespace mechanism, the OS kernel may use a resource control mechanism (i.e.

Cgroup or control group in Linux) to control and isolate the system resources like memory and CPU for each container.

However, due to the above-discussed isolation, traditional security software solutions do not have full visibility into containers. Hence, performing effective security inspections of software running inside the containers becomes challenging and problematic.

SUMMARY

The present disclosure provides effective solutions to security inspection and monitoring of operations within security containers. The solutions overcome the challenges and difficulties caused by the isolation of the containers.

One embodiment relates a computer-implemented method for performing a security inspection of one or more software containers in a host machine. A security agent is initialized in a namespace of the host machine. The security agent is migrated into a first container by changing namespace from the namespace of the host machine to the namespace of the first container. Subsequently, the security agent may be migrated into a second container by changing namespace from the namespace of the first container to the namespace of the second container. Thereafter, the security agent may be migrated back to the host machine by changing namespace from the namespace of the second container to the namespace of the host machine.

Another embodiment relates to a computer-implemented method for user-mode object monitoring of one or more software containers in a host machine. A security agent is migrated into a first container by changing namespace from the namespace of the host machine to the namespace of the first container. The security agent sets up monitoring within the first container and keeps a user-mode object-monitoring handle of the first container. The security agent is further migrated into a second container by changing namespace from the namespace of the first container to the namespace of the second container. The security agent sets up monitoring within the second container and keeps a user-mode object-monitoring handle of the second container. Thereafter, the security agent may migrate into the host machine by changing namespace from the namespace of the second container to the namespace of the host machine. In the host machine, the security agent may continue monitoring events within the first and second containers using the user-mode object-monitoring handles of the first and second containers.

Another embodiment relates to a host machine which includes a first container comprising a first standalone executable software package, a second container comprising a second standalone executable software package, a master agent in a namespace of the host machine, a first security agent in a namespace of the first container, and a second security agent in a namespace of the second container. The first security agent holds a user-mode object-monitoring handle for the first container which allows the master agent to continue to monitor events in the first container. The second security agent holds a user-mode object-monitoring handle for the second container which allows the master agent to continue to monitor events in the second container.

Other embodiments and features of the present invention are also disclosed.

The use of the same reference label in different drawings indicates the same or like components.

DETAILED DESCRIPTION

A software container or container image is a lightweight, standalone, executable package of a piece of software that includes everything needed to run it: code; runtime (i.e. executable code); and necessary system tools, system libraries, and settings. Multiple containers can run on the same machine, and share the operating system (OS) kernel with other containers, as isolated processes in user space.

There are challenges and difficulties in performing security inspection of, and providing security protection to, software containers. These challenges and difficulties are due to the isolation of the containers. Due to the isolation, traditional security software techniques do not have full visibility into containers and so cannot perform effective security inspections or security monitoring.

The presently-disclosed solution may provide various benefits, which may include the following. First, the security agent does not need to be installed or copied into the containers. Second, the security agent only needs to be initiated once. Third, the presently-disclosed solution may perform on-demand security inspection for containers at runtime. Fourth, the presently-disclosed solution may perform on-access security inspection and protection for containers at runtime by user-mode methods. Fifth, the presently-disclosed solution may be implemented with fewer attack surfaces that are vulnerable while performing the security inspection in containers. Sixth, the security agent is capable of using its own security policies and can grant additional privileges to do the security inspection. Seventh, the security agent is capable of running in standalone resource control groups and may be implemented so as to not consume the resource quota of containers.

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

FIGS. 1A, 1B, 1C and 1D depict migration of a roaming security agent 104 into and out of different software containers (102A and 102B) in accordance with an embodiment of the present invention. As shown in these figures, two software container images (Container-A 102A and Container-B 102B) are running in a host machine 101.

Figure 1A:
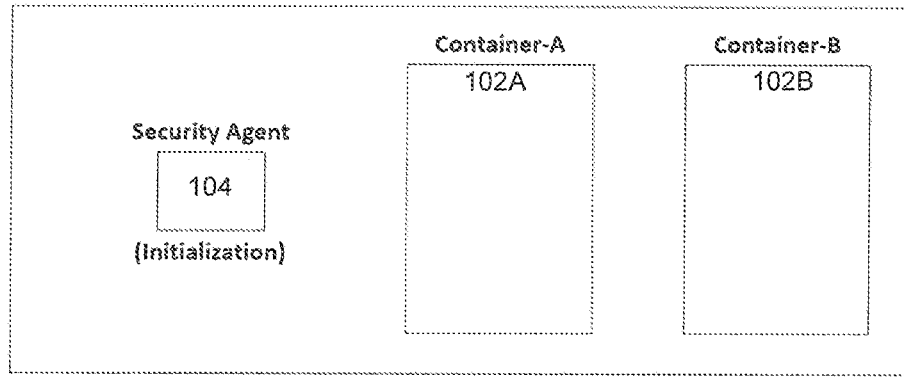
FIGS. 1A, 1B, 1C and 1D depict migration of a security agent into and out of different software containers in accordance with an embodiment of the present invention.

FIG. 1A depicts the security agent 104 after initialization. At this point, the security agent 104 is in the namespace of the host machine 101 and so is outside the containers (102A and 102B). This is because the namespace mechanism of the containers (102A and 102B) isolate them from the security agent 104.

Figure 1B:
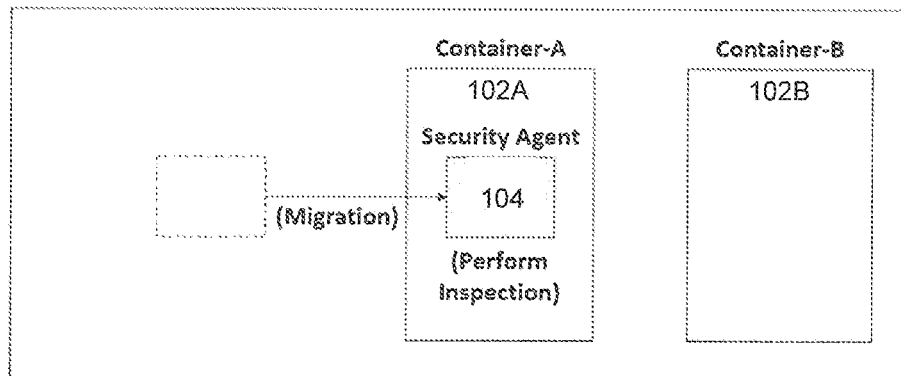

FIG. 1B depicts the security agent 104 after it changes its namespace to be the namespace of Container-A 102A. At this point, the security agent 104 is effectively running within Container-A 102A. This allows the security agent 104 to perform security inspection for software processes running in Container-A 102A.

Figure 1C:
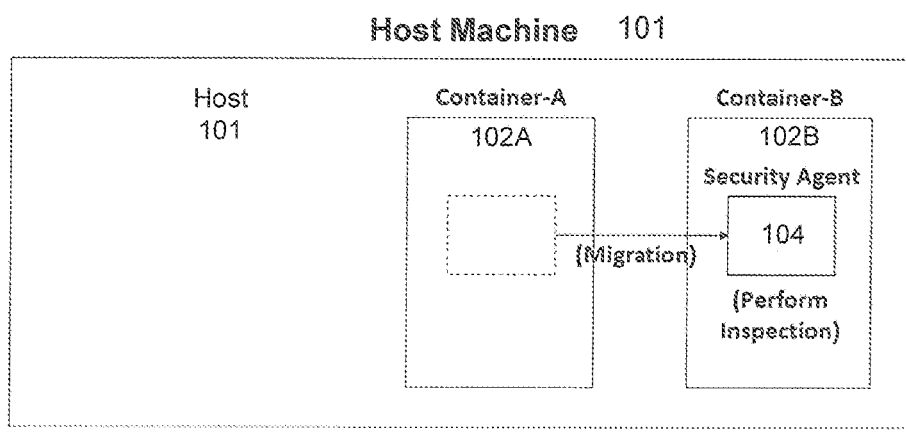

FIG. 1C depicts the security agent 104 after it changes its namespace to be the namespace of Container-B 102B. At this point, the security agent 104 is effectively running within Container-B 102B. This allows the security agent 104 to perform security inspection for software processes running in Container-B 102B.

Figure 1D:
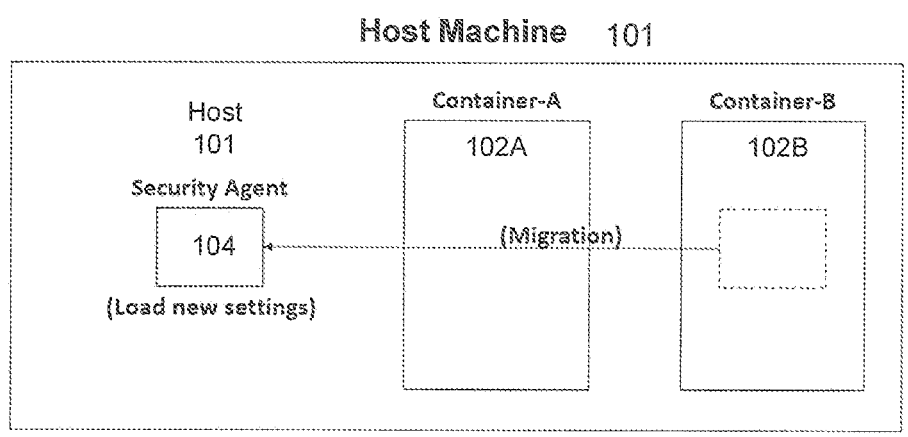

In FIG. 1D, the security agent 104 after it changes its namespace back to be the host namespace. At this point, the security agent 104 is again outside the containers (102A and 102B). Being in the host namespace, the security agent 104 may then load new settings, such as new security inspection rules and new signature patterns, and so on.

To implement the method depicted in FIGS. 1A through 1D, the security agent 104 changes its own namespace to migrate to and from the containers (102A and 102B). Using the LINUX operating system as an example, the namespace change may be implemented by the security agent getting the access handle of the namespace for the target container under its process ID [i.e. by opening the system file under/proc<pid>/ns/] and then using the set namespace application programming interface [setns( ) API] to change its namespace to that pointed to by the access handle.

However, the capability to change the security agent's namespace from the host namespace to the namespace of a container is insufficient to implement the entire method depicted in FIGS. 1A through 1D. This is because, after the security agent 104 changes namespace from the host namespace to the namespace of Container-A 102A, the security agent 104 can then only access the namespace handles of Container-A 102A. At that point, the security agent 104 cannot change its namespace to the namespace of Container-B 102-B or back to the namespace of the host machine 101. This is due to the namespace's isolation and the operating system's security mechanism.

In order to provide the security agent 104 with the capability to make multiple changes to its namespace, the present disclosure provides two exemplary implementations. Each of these exemplary implementations allow the security agent 104 to move between multiple containers (for example, 102-A and 102-B) and move back to the host machine 101.

A first exemplary implementation pre-gets namespace handles and is described below in relation to FIGS. 2A and 2B. A second exemplary implementation uses a master agent and IPC, in addition to the security agent, and is described below in relation to FIGS. 3A, 3B and 3C.

Pre-Getting Namespace Handles

Figure 2A:
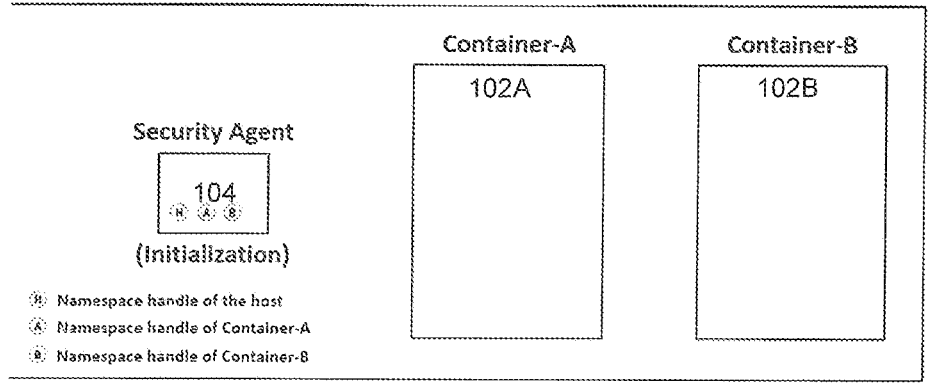
FIGS. 2A and 2B depict the pre-getting of namespace handles by a security agent to enable it to roam between containers in accordance with an embodiment of the present invention.

In the first exemplary implementation, as depicted in FIG. 2A, the security agent 104 pre-gets the namespace handle (H) of the host machine 101, the namespace handle (A) of Container-A 102-A, and the namespace handle (B) of Container-B. While the illustrated example pre-gets the namespace handles for two containers, the namespace handles for any number of containers may be pre-gotten.

Figure 2B:
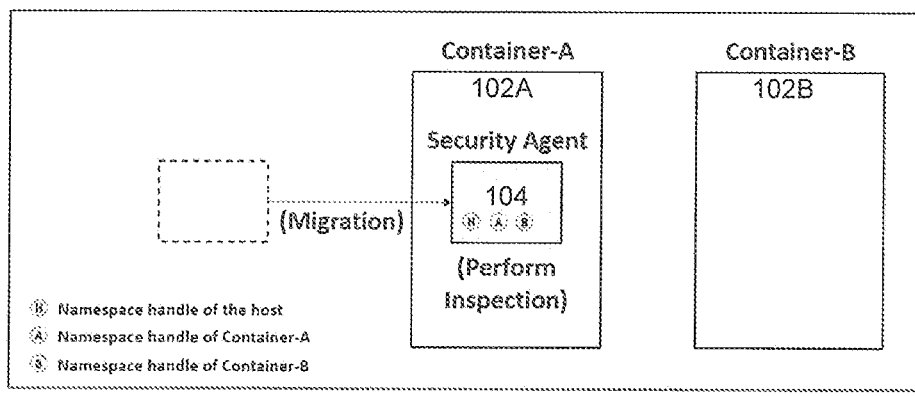

Thereafter, as depicted in FIG. 2B, because the security agent 104 has already pre-gotten the namespace handle (A) of Container-A 102-A, it may change its namespace handle to the namespace handle (A) of Container-A 102-A. This effectively moves the security agent 104 into the namespace of Container-A 102-A so that it may perform inspection within that container.

Similarly, because the security agent 104 has already pre-gotten the namespace handle (B) of Container-B 102-B, it may change its namespace handle to the namespace handle (B) of Container-B 102-B. This effectively moves the security agent 104 into the namespace of Container-B 102-B so that it may perform inspection within that container.

Furthermore, because the security agent 104 has already pre-gotten the namespace handle (H) of the host machine 101, it may also change its namespace handle to the namespace handle (H) of the host machine 101. This effectively returns the security agent 104 into the namespace of the host machine 101. Being in the host namespace, the security agent 104 may then load new settings, such as new security inspection rules and new signature patterns, and so on.

Master Agent and IPC

Figure 3A:
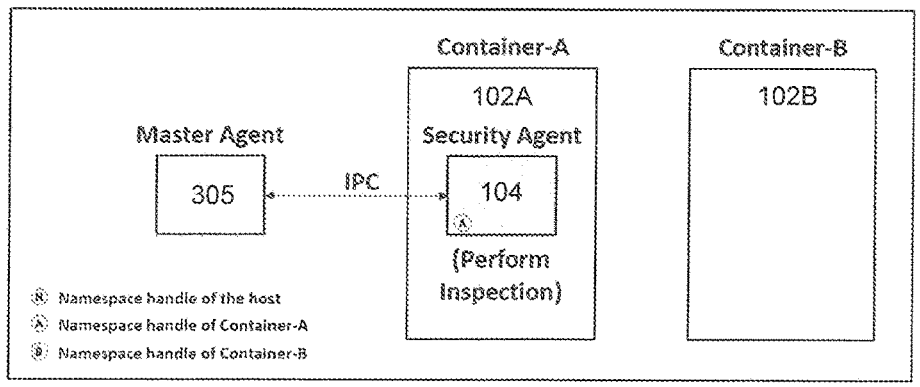
FIGS. 3A, 3B, and 3C depict a security agent that uses IPC to get file handles from other processes to enable it to roam between containers in accordance with an embodiment of the present invention.
Figure 3B:
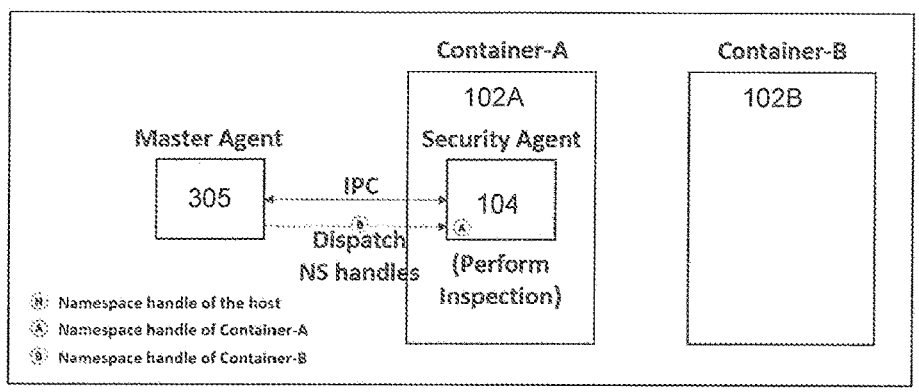
Figure 3C:
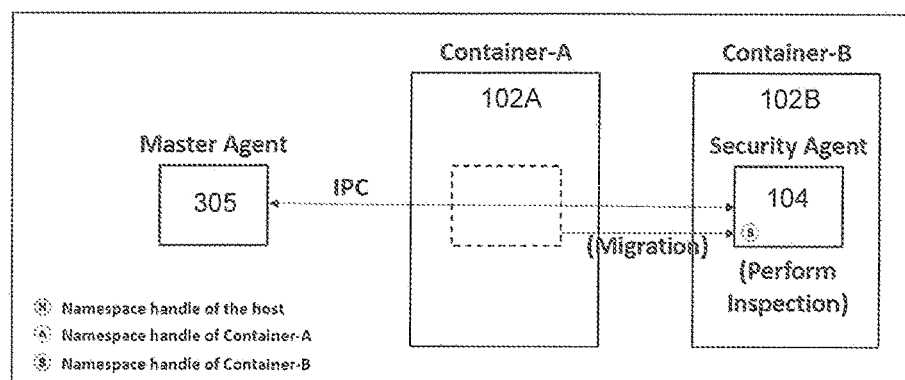

In the second exemplary implementation, as depicted in FIGS. 3A through 3C, a master agent 305 runs and stays in the namespace of the host machine 101. The master agent 305 operates as the controller to control the security agent 104.

In the example illustration of FIG. 3A, the security agent 104 is running in Container-A 102-A, while the master agent 305 runs in the host namespace. Because the security agent 104 is in the namespace of Container-A 102-A, it may perform inspection within that container. While performing the inspection, the security agent 104 may keep open an IPC (inter-process communications) mechanism to the master agent 305. Hence, the results of the inspection may be communicated from the security agent 104 to the master agent 305 via the IPC mechanism.

Thereafter, as depicted in FIG. 3B, the master agent 305 may dispatch the namespace (NS) handle (B) for Container-B 102-B to the security agent 104. This may be performed, in some operating systems, using an IPC mechanism. For example, in the LINUX platform, we can use a UNIX socket to dispatch and transfer namespace handles.

Then, as depicted in FIG. 3C, the security agent 104 may change its namespace handle to the namespace handle (B) of Container-B 102-B. This effectively moves the security agent 104 into the namespace of Container-B 102-B so that it may perform inspection within that container. The results of the inspection may be communicated from the security agent 104 to the master agent 305 via an IPC mechanism.

Use Cases: On-Demand Scanning and On-Access Monitoring and Scanning

The presently-disclosed solution may be used for security inspections to inspect resources and objects in a container or other namespace. Example of resources and objects that may be inspected include files, processes, network connection, and others. The inspections may be performed on-demand or on-access.

On-Demand Scanning

On-demand scans for indicators of compromise (IOC) on containers at runtime may be performed by the presently-disclosed solution. In accordance with an embodiment of the invention, the on-demand IOC scan by a security agent searches within a container for variant types of data, such as hashes of files or processes, suspicious network connections, and other types of data which indicate a computer intrusion with a high-degree of confidence. Due to the namespace isolation of a container, a conventional security solution would have substantial difficulty in performing an effective IOC scan on a container. However, the presently-disclosed solution changes the namespace handle of the security agent so as to perform an effective IOC scan within the container.

On-demand anti-malware scans of containers may also be performed by the presently-disclosed solution. In accordance with an embodiment of the invention, the security agent is moved into the container(s) to scan the files. The scanned file contents may then be compared with malware detection patterns, or used to query detect query cloud databases for malware detection. The security agent may also collect the files and provide them to a sandbox analyzer. The sandbox analyzer machine may be in the host, in another container, or at a remote machine.

On-demand software artifact and configuration scans of containers may also be performed by the presently-disclosed solution. In accordance with an embodiment of the invention, the security agent is moved into the container(s) to obtain information of software artifact and configurations. The software artifact and configurations may then be used to find vulnerabilities, or feedback to other security modules to generate recommended security policies and enhance the security protections.

On-Access Monitoring and Scanning

Conventional on-access object monitoring and scanning usually requires installing kernel-mode hook modules. Kernel-mode hook modules are custom kernel modules that may have compatibility issues and may negatively affect system reliability.

Some operating system kernels provide user-mode object monitoring mechanisms (for example, LINUX's inotify or fanotify). However, the user-mode object monitoring cannot usually be used to monitor object accesses or modifications that occur in another namespace, such as a container namespace.

The presently-disclosed solution provides the capability of moving the security agent into a container. In accordance with an embodiment of the invention, when the security agent is within the container, the security agent sets up the user-mode object monitoring to monitor operations that occur in the container. With this in-container user-mode object monitoring, many security inspection and protection functions may be provided, such as real-time integrity monitoring, real-time anti-malware scanning, and so on.

Setting up User-Mode Object Monitoring Using Single Security Agent

Figure 4A:
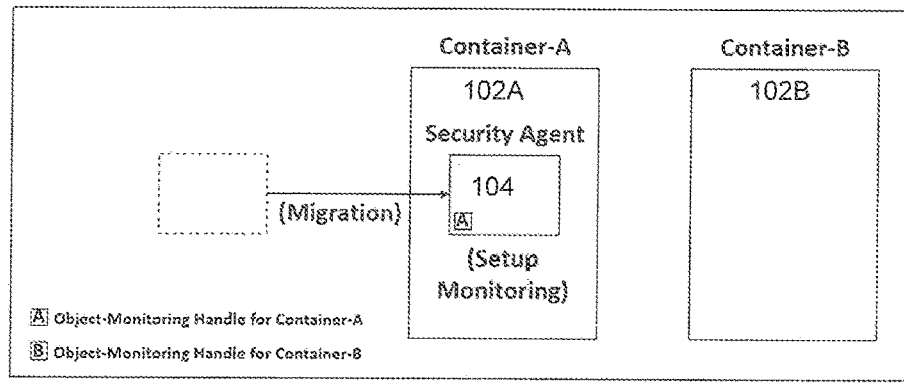
FIGS. 4A, 4B, and 4C depict using a single security agent to setup user-mode object monitoring in multiple containers in accordance with an embodiment of the present invention.
Figure 4B:
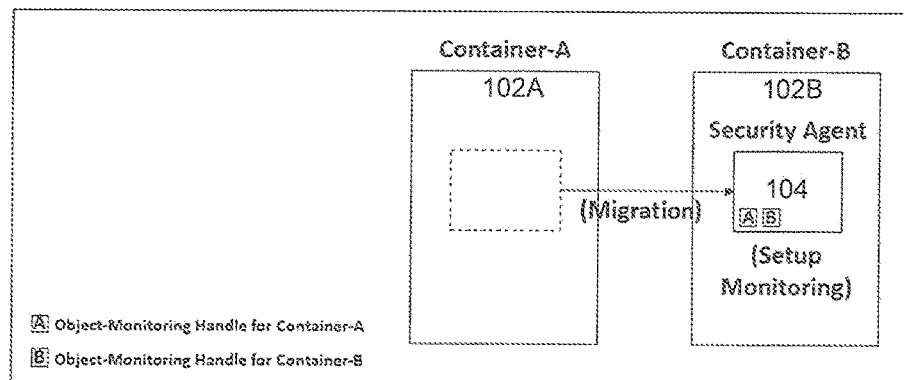
Figure 4C:
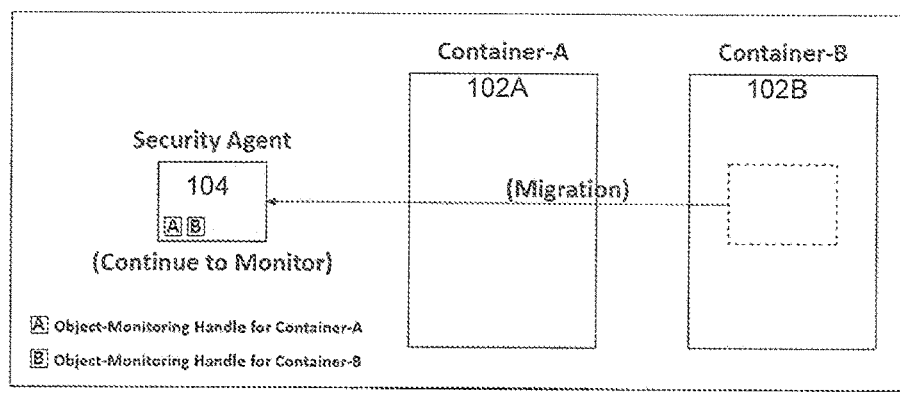

In accordance with an embodiment of the invention, user-mode object monitoring may be set up in multiple containers using a single security agent. This method is depicted in FIGS. 4A through 4C. In an exemplary implementation, the security agent 104 may migrate between the host machine and the containers (102A and 102B) by the pre-getting method described above in relation to FIGS. 2A and 2B (by pre-getting the namespace handles of the containers and holding them, along with the namespace handle of the host machine). Furthermore, after setting up monitoring in a container, the security agent may hold onto the user-mode object-monitoring handle to enable it to continue to monitor operations in that container, even after it moves to another container or back to the host machine.

As shown in FIG. 4A, the security agent 104 may migrate to Container-A 102A. The security agent 104 will then setup monitoring within that container and keep the user-mode object-monitoring handle [A], which allows it to continue to monitor user-mode events in Container-A 102A, even when it is no longer in the namespace of that container.

As shown in FIG. 4B, the security agent 104 may migrate to Container-B 102B. The security agent 104 will then setup monitoring within that container and keep the user-mode object-monitoring handle [B], which allows it to continue to monitor user-mode events in Container-B 102B, even when it is no longer in the namespace of that container. In addition, the security agent 104 still keeps the user-mode object-monitoring handle(s) which it obtained previously while setting up monitoring in other containers. In the illustrated example, this means that the security agent 104 is now keeping the user-mode object-monitoring handle [A] for Container-A 102A and the user-mode object-monitoring handle [B] for Container-B 102B.

As shown in FIG. 4C, the security agent 104 may migrate back to the host machine 101. While in the namespace of the host machine 101, the security agent 104 may use the user-mode object-monitoring handle [A] to continue to monitor user-mode operations in Container-A 102A and may use the user-mode object-monitoring handle [B] to continue to monitor user-mode operations in Container-B 102B.

Figure 5:
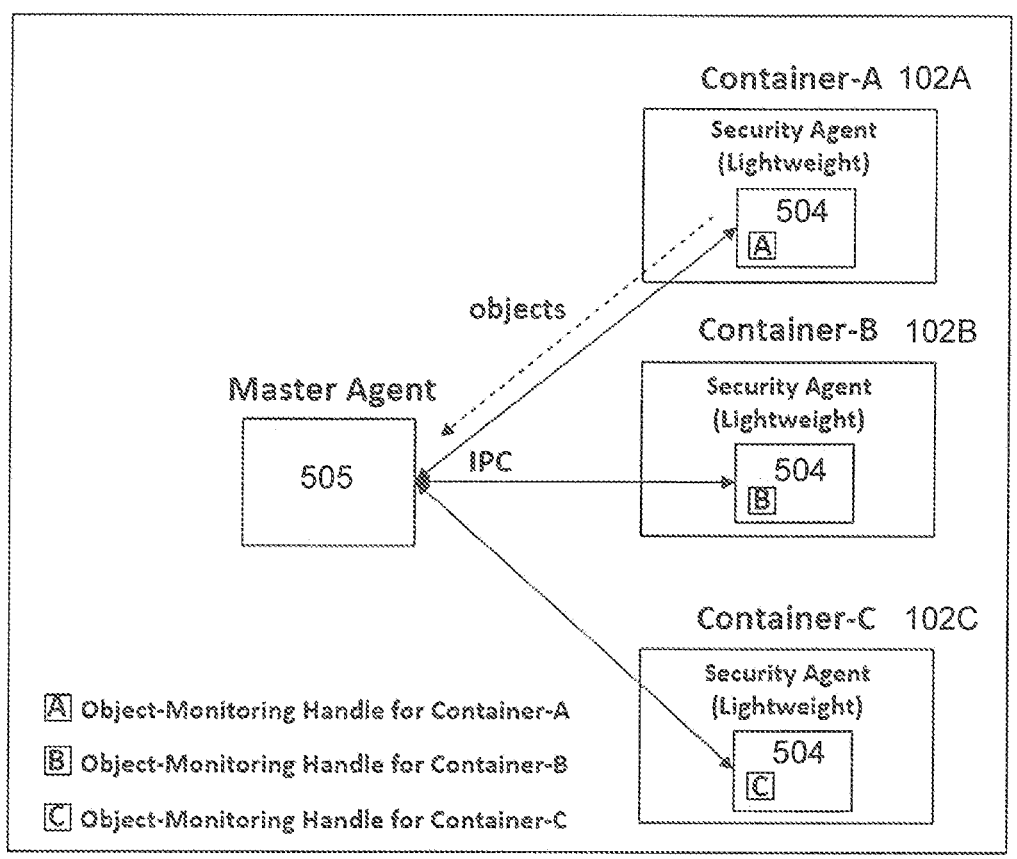
FIG. 5 depicts using a master agent and multiple lightweight security agents to setup user-mode object monitoring in multiple containers in accordance with an embodiment of the present invention.

Setting Up User-Mode Object Monitoring with a Master Agent and Multiple Lightweight Security Agents In accordance with an embodiment of the invention, user-mode object monitoring may be set up in multiple containers using a master agent 505 and multiple security agents 504, which may be lightweight in that they may utilize some functionalities from the master agent. This method is depicted in FIG. 5.

As shown, multiple security agents 504 may be created and moved into the containers that need to user-mode object monitoring. In the example depicted, three security agents 504 are created in the host machine 101 and moved (by change of namespace handle) so that a security agent 504 is within each of the three containers (Container-A 102A, Container-B 102B, and Container-C 102C) and holds a user-mode object-monitoring handle for that container ([A], [B], and [C], respectively). Each security agent 504 can optionally setup IPC to the master agent 505 in the host machine 101.

When the security agent 504 detects a file access event, for example, the security agent 504 may handle the event directly. Optionally, the security agent 504 may request that the master agent 505 handle the security inspection of the event, such as by performing anti-malware scanning, for example. In order to have the master agent 505 perform the security inspection in relation to the event, the security agent 504 may either dispatch the file handles to the master agent 505, or copy the files via IPC to the master agent 505, or use an input/output redirect mechanism to allow the master agent 505 to inspect the files within the container.

Selective Migration

In accordance with an embodiment of the invention, to reduce the attack surface, the presently-disclosed security agent may be operated so as to move into some namespaces in the computer system, not all namespaces. This selective migration may be utilized so as to reduce the "attack surface" that is to be protected.

As one example of selective migration, if there is needed only a security inspection on the file system, then the security agent may be operated or configured so as to only change its file-system namespace (for example, the MNT namespace in the LINUX platform). Being in the file-system namespace, the security agent is not in the same process namespace (for example, the PID namespace in the LINUX platform) as other processes. As such, other processes cannot see the security agent and will not be able to attack the processes of the security agent.

As another example of selective migration, there may be a need for the security agent to communicate with a remote security service or services. For example, the remote security service(s) may be a sandbox analyzer and/or a cloud security service. In this case, when moving to the namespace of a container by changing its namespace handle, the security agent may be operated or configured specifically to not change its network namespace. As a result, the security agent may maintain its network connection to the remote security server(s), even after being moved to within the container. Advantageously, this feature reduces the configuration complexity and also avoids the need to change network settings to setup connections between security agents in containers and remove servers. Furthermore, this feature enhances security because connections from containers to remote security servers do not have to be allowed more generally.

Other Advantageous Features

In accordance with an embodiment of the invention, besides the selective namespace migration discussed above, the security agent may be configured to select to use different security policies and grant additional privileges. For example, the security agent may be granted privileges which are outside the limitations of the container's normal security policies so that the security agent has full capabilities to perform its security inspection.

In accordance with an embodiment of the invention, the security agent may be running in another resource control group, besides that of the container. As a result, when the security inspection is being performed in a container, it will not consume part of the resource quota of that container so as to have less performance impact on that container.

Exemplary Architecture

Figure 6:
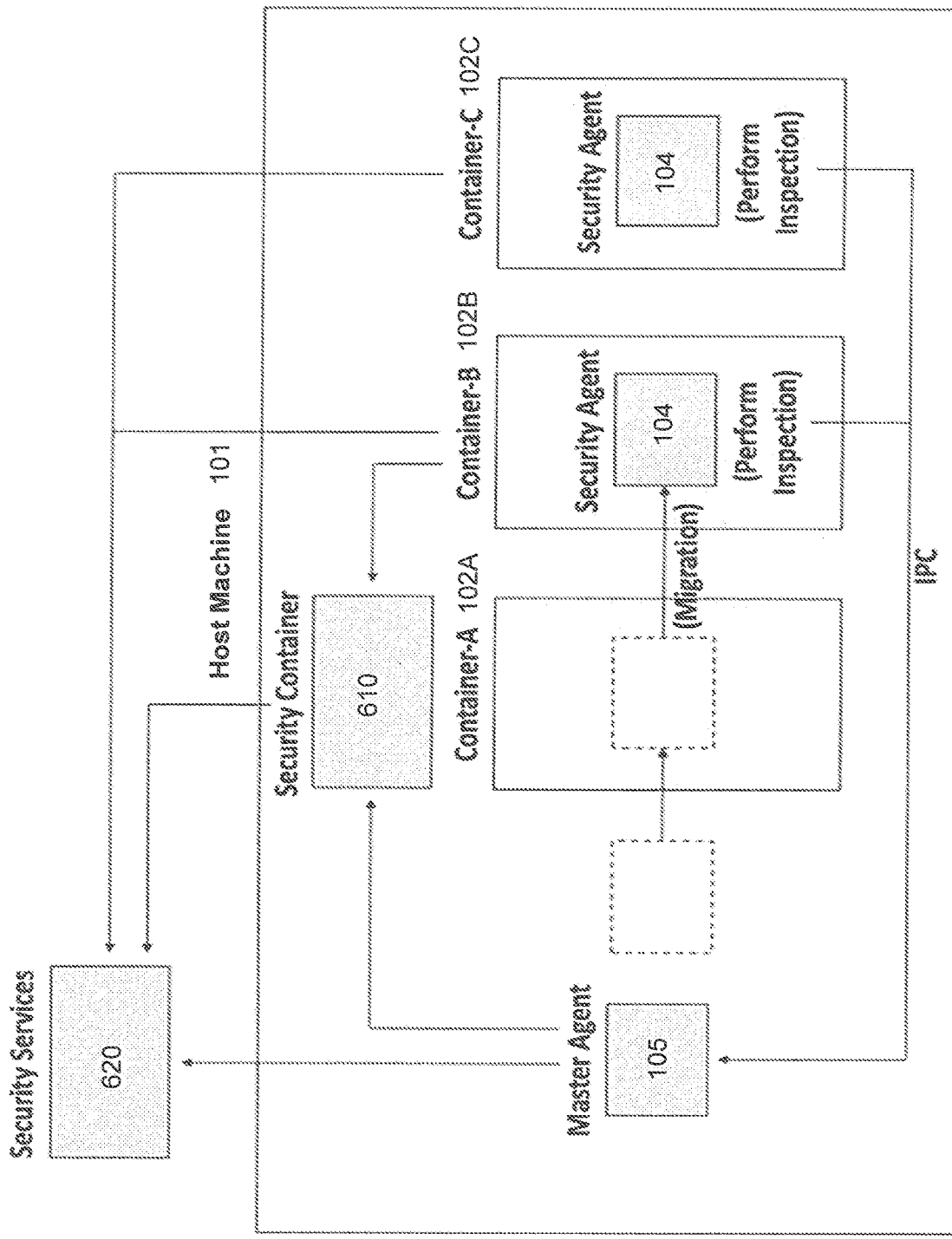
FIG. 6 provides an overview and an exemplary architecture for an embodiment of the present invention.

FIG. 6 depicts an overview and an exemplary architecture for an embodiment of the present invention. The following provides a summary description of the components in the architecture.

Host Machine: As depicted, the host machine 101 is the computer system which has the container platform to run containers (102A, 102B, and 102C, for example). The host machine 101 may be a physical machine in one implementation, and the host machine 101 may be a virtual machine in another implementation.

Security Agent(s): In each host machine 101, there may be utilized one or multiple security agents 104. Each security agent may selectively change its own namespace to roam between the namespace of the host machine and the namespaces of the containers. In one implementation, the security agent may be a self-contained agent that can perform security inspection by itself autonomously. In another implementation, the security agent may be a lightweight security agent that only help to setup the monitoring handle or provide the access to the objects in containers for other security components. A lightweight agent may offload heavy security inspection tasks to other components. Security agents may communicate to a master agent 105, other security containers or remote security services 620.

Master Agent: A master agent 105 is an optional agent that runs in the host. The master agent may be a controller to control security agents. The master agent may help to get the namespace handles on the host and dispatch the handles to security agents. The master agent may also provide more security inspection functions. The master agent may communicate to one or more security containers 610 or remote security services 620.

Security Container: One or more security containers 610 may be deployed in the host machine to provide additional security services in the same machine. A security agent may either communicate with security containers directly, or rely on a master agent to access security containers.

Security Services: The security solutions disclosed herein may optionally communicate with remote security services 620. For example, security services may be cloud security services or remote sandboxes. A security agent may either communicate with security services directly or rely on master agent to access security services.

Components of an Example Computer System

Figure 7:
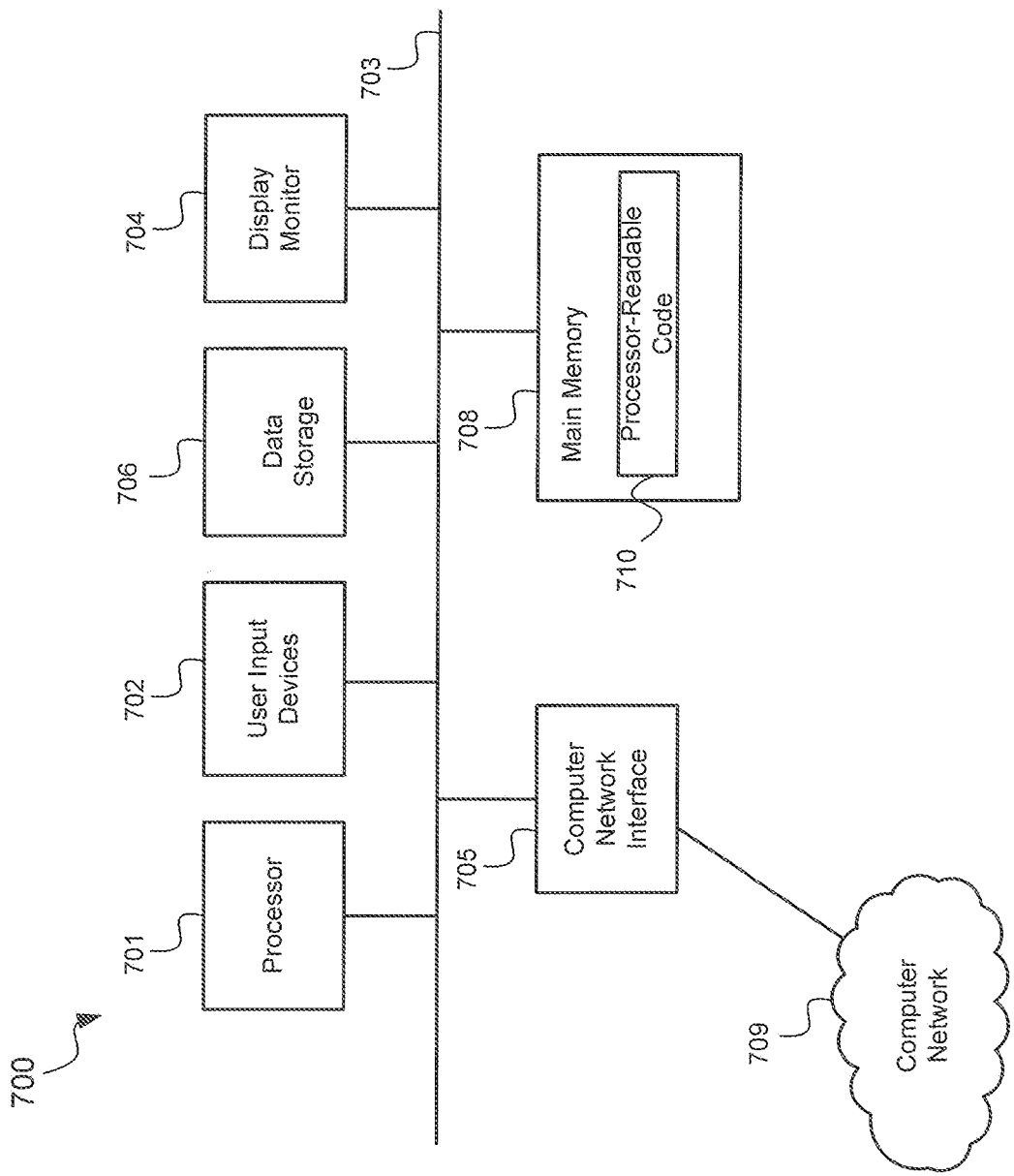
FIG. 7 is a schematic diagram showing, at a high level, components of a computer system in accordance with an embodiment of the present invention.

FIG. 7 depicts, at a high level, components of the computer system. A computer system may be implemented with fewer or more components than depicted. For example, the computer system may include one or more processors 701 and one or more buses 703 coupling its various components. The computer systems may also include one or more user input devices 702 (e.g., keyboard, mouse), one or more data storage devices 706 (e.g., hard drives, optical disk, Universal Serial Bus memory), one or more display monitors 704 (e.g., liquid crystal display, flat panel monitor), one or more computer network interfaces 705 (e.g., network adapter, modem), and a main memory 708 (i.e., random access memory). As shown, a computer network interface 705 may be coupled to a computer network 709.

The computer system is a particular machine as programmed with one or more software modules, comprising computer-readable code or instructions 710 stored non-transitory in the main memory 708 for execution by the processor 701. An article of manufacture may be embodied as computer-readable storage medium including instructions that when executed by a processor 701 causes the computer system to be operable to perform the functions of the one or more software modules. The software modules may include, among others, the operating system kernel, the software container images, and the security agent related software described above.

Advantages and Benefits

The presently-disclosed solution may provide various benefits, which may include the following. First, the security agent does not need to be installed or copied into the containers. Second, the security agent only needs to be initiated once. Third, the presently-disclosed solution may perform on-demand security inspection for containers at runtime. Fourth, the presently-disclosed solution may perform on-access security inspection and protection for containers at runtime by user-mode methods. Fifth, the presently-disclosed solution may be implemented with fewer attack surfaces that are vulnerable while performing the security inspection in containers. Sixth, the security agent is capable of using its own security policies and can grant additional privileges to do the security inspection. Seventh, the security agent is capable of running in standalone resource control groups and may be implemented so as to not consume the resource quota of containers.

CONCLUSION

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for performing a security inspection of one or more software containers in a host machine, the method comprising:
   initializing a security agent in a namespace of the host machine;
   migrating the security agent into a first container by changing namespace from the namespace of the host machine to a namespace of the first container, wherein the first container comprises a first standalone executable software package;
   the security agent running in the first container and performing a first security inspection of resources and objects in the first container;
   migrating the security agent into a second container by changing namespace from the namespace of the first container to the name space of the second container, wherein the second container comprises a second standalone executable software package;
   the security agent running in the second container and performing a second security inspection of resources and objects in the second container; and
   a master agent in the namespace of the host machine communicating with the security agent using inter-process communications while the security agent is in the first container and in the second container.

2. The computer-implemented method of claim 1, further comprising:
   pre-getting a namespace handle of the host machine and a namespace handle of the first container; and
   storing the namespace handle of the host machine and the namespace handle of the first container in the security agent; and
   using the namespace handle of the first container by the security agent to migrate from the host machine to the first container.

3. The computer-implemented method of claim 1, further comprising:
   pre-getting a namespace handle of the host machine, a namespace handle of the first container, and a namespace handle of the second container;
   storing the namespace handle of the host machine, the namespace handle of the first container, and the namespace handle of the second container in the security agent;
   using the namespace handle of the first container by the security agent to migrate from the host machine to the first container; and
   using the namespace handle of the second container by the security agent to migrate from the first container to the second container.

4. The computer-implemented method of claim 1, further comprising:
   dispatching a namespace handle of the second container to the security agent while the security agent is in the first container; and
   using the namespace handle of the second container by the security agent to migrate from the first container to the second container.

5. The computer-implemented method of claim 1, further comprising:
   migrating the security agent from the namespace of the second container back to the host namespace; and
   loading new settings by the security agent.

6. The computer-implemented method of claim 5, further comprising:
   pre-getting a namespace handle of the host machine, a namespace handle of the first container, and a namespace handle of the second container;
   storing the namespace handle of the host machine, the namespace handle of the first container, and the namespace handle of the second container in the security agent;
   using the namespace handle of the first container by the security agent to migrate from the host machine to the first container;
   using the namespace handle of the second container by the security agent to migrate from the first container to the second container; and
   using the namespace handle of the host machine by the security agent to migrate from the second container to the host machine.

7. The computer-implemented method of claim 5, further comprising:
   dispatching a namespace handle of the second container to the security agent while the security agent is in the first container;
   using the namespace handle of the second container by the security agent to migrate from the first container to the second container;
   dispatching a namespace handle of the host machine to the security agent while the security agent is in the second container;
   using the namespace handle of the host machine by the security agent to migrate from the second container to the host machine.

8. The computer-implemented method of claim 1, wherein each said standalone executable software package comprises code and runtime, along with necessary software tools, system libraries, and settings.

9. The computer-implemented method of claim 1, wherein said migration of the security agent into the first container is selective in that the change in namespace applies only to a file-system namespace and not to a process namespace.

10. The computer-implemented method of claim 1, wherein said migration of the security agent into the first container is selective in that the change in namespace does not change a network namespace such that the security agent maintains a network connection to a remote security server.

11. The computer-implemented method of claim 10, wherein the remote security server provides a cloud security service.

12. The computer-implemented method of claim 10, wherein the remote security server provides a sandbox analyzer service.

13. The computer-implemented method of claim 1, wherein each said security agent is configured to perform an on-demand scan for indicators of compromise.

14. A computer-implemented method for user-mode object monitoring of one or more software containers in a host machine, the method comprising:
   migrating a security agent into a first container by changing namespace from a namespace of the host machine to a namespace of the first container, wherein the first container comprises a first standalone executable software package, and wherein the security agent sets up user-mode monitoring within the first container and keeps a user-mode object-monitoring handle of the first container;
   migrating the security agent into a second container by changing namespace from the namespace of the first container to a namespace of the second container, wherein the second container comprises a second standalone executable software package, and wherein the security agent sets up user-mode monitoring within the second container and keeps a user-mode object-monitoring handle of the second container;
   the security agent running in the second container and performing a second security inspection of resources and objects in the second container; and
   a master agent in the namespace of the host machine communicating with the security agent using inter-process communications while the security agent is in the first container and in the second container.

15. The computer-implemented method of claim 14, further comprising:
   migrating the security agent into the host machine by changing namespace from the namespace of the second container to the namespace of the host machine, wherein the security agent continues monitoring events within the first and second containers using the user-mode object-monitoring handles of the first and second containers.

16. The computer-implemented method of claim 14, wherein each said standalone executable software package comprises code and runtime, along with necessary software tools, system libraries, and settings.

17. The computer-implemented method of claim 14, wherein one or more of said security agents are configured to perform in-container real-time anti-malware scanning.

18. A host machine comprising:
   a processor for executing computer-readable instructions;
   memory for storing and accessing the computer-readable instructions and data;
   a first container comprising a first standalone executable software package;
   a second container comprising a second standalone executable software package;
   a master agent in a namespace of the host machine;
   a security agent in a namespace of the first container, wherein the security agent holds a user-mode object-monitoring handle for the first container which allows the master agent to continue to monitor events in the first container, wherein the security agent is configured to migrate into the second container by changing namespace from the namespace of the first container to the namespace of the second container, and wherein the security agent is further configured to run in the second container and perform a second security inspection of resources and objects in the second container, wherein the security agent holds a user-mode object-monitoring handle for the second container which allows the master agent to continue to monitor events in the second container.

19. The host machine of claim 18, wherein the security agent sets up inter-process communications with the master agent.

20. The host machine of claim 18, further comprising:
   a third container comprising a third standalone executable software package; and
   a second security agent in a namespace of the third container, wherein the second security agent holds a user-mode object-monitoring handle for the third container which allows the master agent to continue to monitor events in the third container.

21. The host machine of claim 18, wherein each said standalone executable software package comprises code and runtime, along with necessary software tools, system libraries, and settings.

* * * * *